No. 613,788. Patented Nov. 8, 1898.
C. A. R. YOUNGQUIST.
DEVICE FOR HANDLING CANS, BOTTLES, JUGS, &c.
(Application filed Dec. 6, 1897.)
(No Model.)
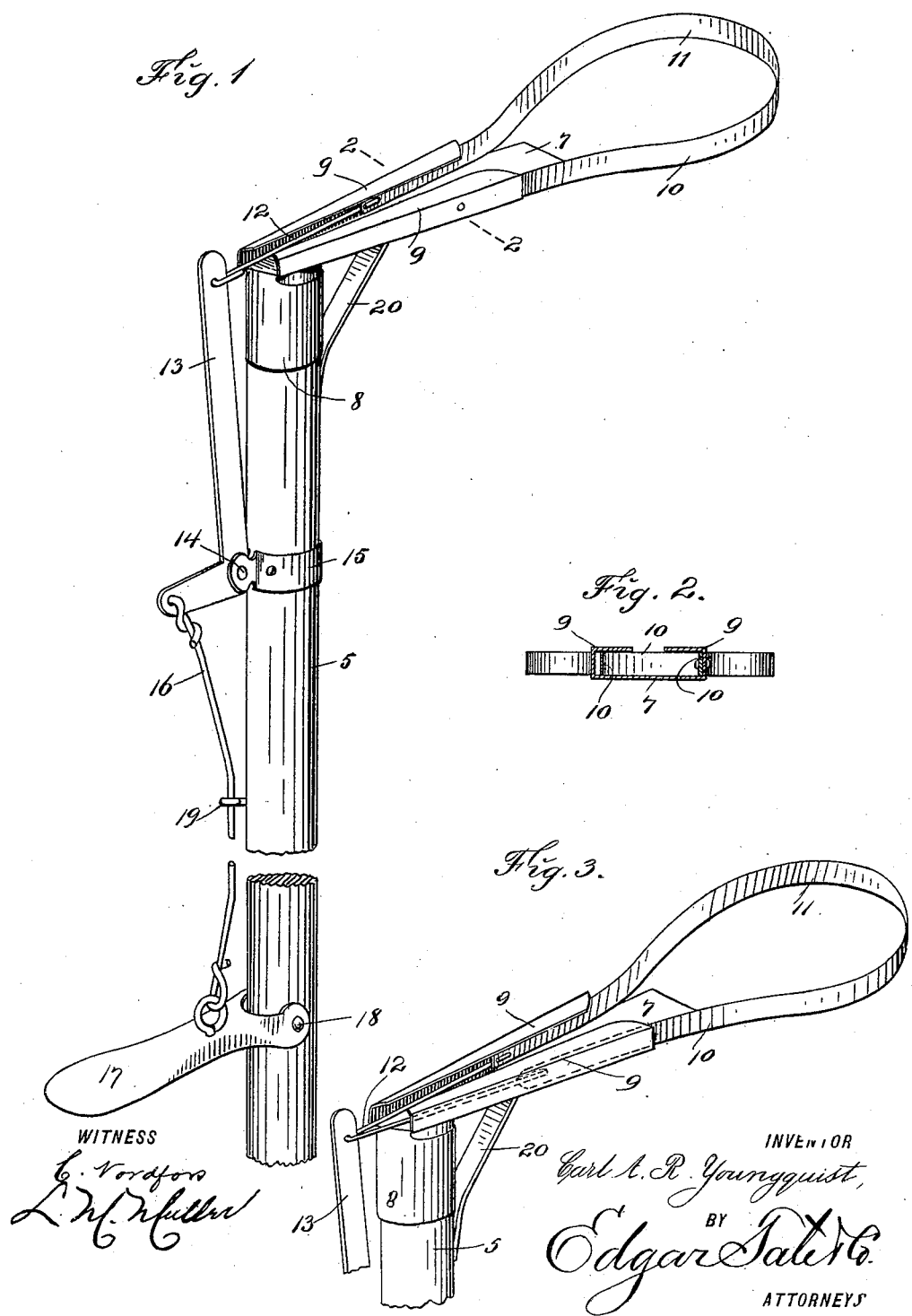
WITNESS
INVENTOR
Carl A. R. Youngquist,
BY
Edgar Tate & Co.
ATTORNEYS

UNITED STATES PATENT OFFICE.

CARL ALBIN REINHOLD YOUNGQUIST, OF NEW YORK, N. Y.

DEVICE FOR HANDLING CANS, BOTTLES, JUGS, &c.

SPECIFICATION forming part of Letters Patent No. 613,788, dated November 8, 1898.

Application filed December 6, 1897. Serial No. 660,969. (No model.)

*To all whom it may concern:*

Be it known that I, CARL ALBIN REINHOLD YOUNGQUIST, a citizen of the United States, residing at New York, in the county of New York and State of New York, have invented certain new and useful Improvements in Devices for Handling Cans, Bottles, Jugs, Jars, and other Vessels or Articles, of which the following is a full and complete specification, such as will enable those skilled in the art to which it appertains to make and use the same.

This invention relates to devices for handling cans, bottles, jugs, jars, and other vessels or articles; and the object thereof is to provide an improved device for this purpose which may be used in placing such vessels or articles on shelves and for removing them therefrom when desired, a further object being to provide an improved device for this purpose which is simple in construction and operation and comparatively inexpensive.

The invention is fully disclosed in the following specification, of which the accompanying drawings form a part, in which the separate parts of my improvement are designated by the same numerals of reference in each of the views, and in which—

Figure 1 is a perspective view of my improved device; Fig. 2, a section on the line 2 2 of Fig. 1, and Fig. 3 a view similar to Fig. 1 of a part of the device and showing a modified form of construction.

In the practice of my invention I provide, as shown in Figs. 1 and 2, a device of the class herein specified, which comprises a handle 5, which may be of any desired length, and mounted on or secured to the upper end thereof is an angularly-projecting plate 7, the wider end of which is directed outwardly and the narrow end of which is provided with a tubular head 8, into which the end of the handle 5 is inserted, and the plate 7 is provided at each side with upwardly and inwardly curved flanges 9, and secured to the inner side of the upwardly-directed portion of one of the flanges 9 is a strong steel spring 10, which is curved into a loop, as shown at 11, and the free end of which is passed backwardly into a casing formed by the plate 7 and the upwardly and inwardly curved flanges at the sides thereof, and connected therewith is a rod 12, the outer end of which is connected with a crank-lever 13, which is pivotally connected with the handle 5 at 14 by means of a clamp or band 15 or in any desired manner, and connected with the shorter arm of the lever 13 is a rod 16, the lower end of which is connected with a lever 17, which is pivotally connected with the handle 5 at 18, and the rod 16 is preferably passed through an eye or ring 19, which is secured to the handle 5.

The plate 7 is provided with a brace, as 20, which is connected with the handle 5 or with the tubular head 8, and it will be apparent that any suitable frame may be substituted for the frame-plate 7 and the upwardly and inwardly directed flanges 9, the only object in this connection being to provide an angular support for the spring-clamp formed by the steel spring or band 10.

The operation will be readily understood from the foregoing description when taken in connection with the accompanying drawings and the following statement thereof.

In handling a bottle, jug, can, jar, or other vessel or article in order to remove the same from a shelf the handle 5 is grasped in one hand and the lever 17 is raised so as to force the longer arm of the lever 13 in the direction of the upper end of the handle, and this operation will force the free end of the spring or band 10 outwardly and enlarge the loop 11, so that it may be passed over the vessel or article, and then by pulling downwardly on the lever 17 the free end of the spring or band 10 will be drawn in the direction of the lever 13 and the spring or band 10 will be caused to securely grasp and hold the said vessel or article, and said vessel or article may be removed from a shelf or other support, as will be readily understood; and it will also be apparent that the vessel or other article may be placed upon a shelf or other support by a similar operation.

In Fig. 3 I have shown a modified form of construction in which both ends of the spring-clamp 10 are passed loosely through the frame consisting of the plate 7 and the upwardly and inwardly directed flanges 9, and each end of said spring-clamp is connected with a rod 12, and said rods 12 are connected with the lever 13, and the operation of this form of construction will be substantially the same as that hereinbefore described, the only difference being that both ends of the spring-clamp 10 are moved outwardly so as to enlarge the loop 11 and both ends are pulled through the frame or support by means of the lever 13.

My improvement is simple in construction and operation, and it will be apparent that changes in and modifications of the form and construction of the various parts may be made without departing from the spirit of my invention or sacrificing its advantages.

Having fully described my invention, I claim as new and desire to secure by Letters Patent—

1. A device for handling cans, bottles, jugs, jars and other vessels or articles, the same consisting of a handle or rod, a frame arranged at an angle to said handle, or rod, a spring-band secured to one side of said frame, and curved to form a loop which projects in line therewith, the free end being passed backwardly through said frame, a crank-lever pivotally connected with said handle, and also with the free end of said band or spring, and means for operating said crank-lever, substantially as shown and described.

2. A device for handling cans, bottles, jugs, jars and other vessels or articles, the same consisting of a handle or rod, a frame arranged at an angle to said handle or rod, a spring-band secured to one side of said frame, and curved to form a loop which projects in line therewith, the free end being passed backwardly through said frame, a crank-lever pivotally connected with said handle, and also with the free end of said band or spring, and means for operating said crank-lever, consisting of a lever which is pivotally connected with said handle, and in operative connection with said crank-lever, substantially as shown and described.

3. A device for handling cans, bottles, jugs, jars and other vessels or articles, the same consisting of a handle or rod, a frame arranged at an angle to said handle or rod, a spring-band mounted in said frame, and formed into a loop, and means for operating said spring-band so as to enlarge or contract said loop, substantially as shown and described.

4. A device for handling cans, jugs, jars and other vessels or articles, the same consisting of a handle or rod, a rigid frame arranged at an angle to said handle or rod, a spring-band arranged to slide upon said frame, and curved to form a loop between its ends and at the outer end of said frame, said frame being flanged to guide said band, and means for operating said spring-band so as to enlarge or contract said loop, substantially as described.

5. A device for handling cans, jugs, jars, and other vessels or articles, the same consisting of a handle or rod, to one end of which is secured a frame which projects at an angle to said handle or rod, a spring-band secured to one side of said frame, and curved to form a loop which projects in line therewith, and the free end of which is passed backwardly through said frame, and means connected with the free end of said spring-band for operating the same so as to enlarge or contract said loop, substantially as described.

In testimony that I claim the foregoing as my invention I have signed my name, in presence of the subscribing witnesses, this 30th day of November, 1897.

CARL ALBIN REINHOLD YOUNGQUIST.

Witnesses:
M. A. KNOWLES,
L. M. MULLER.